UNITED STATES PATENT OFFICE 2,353,552

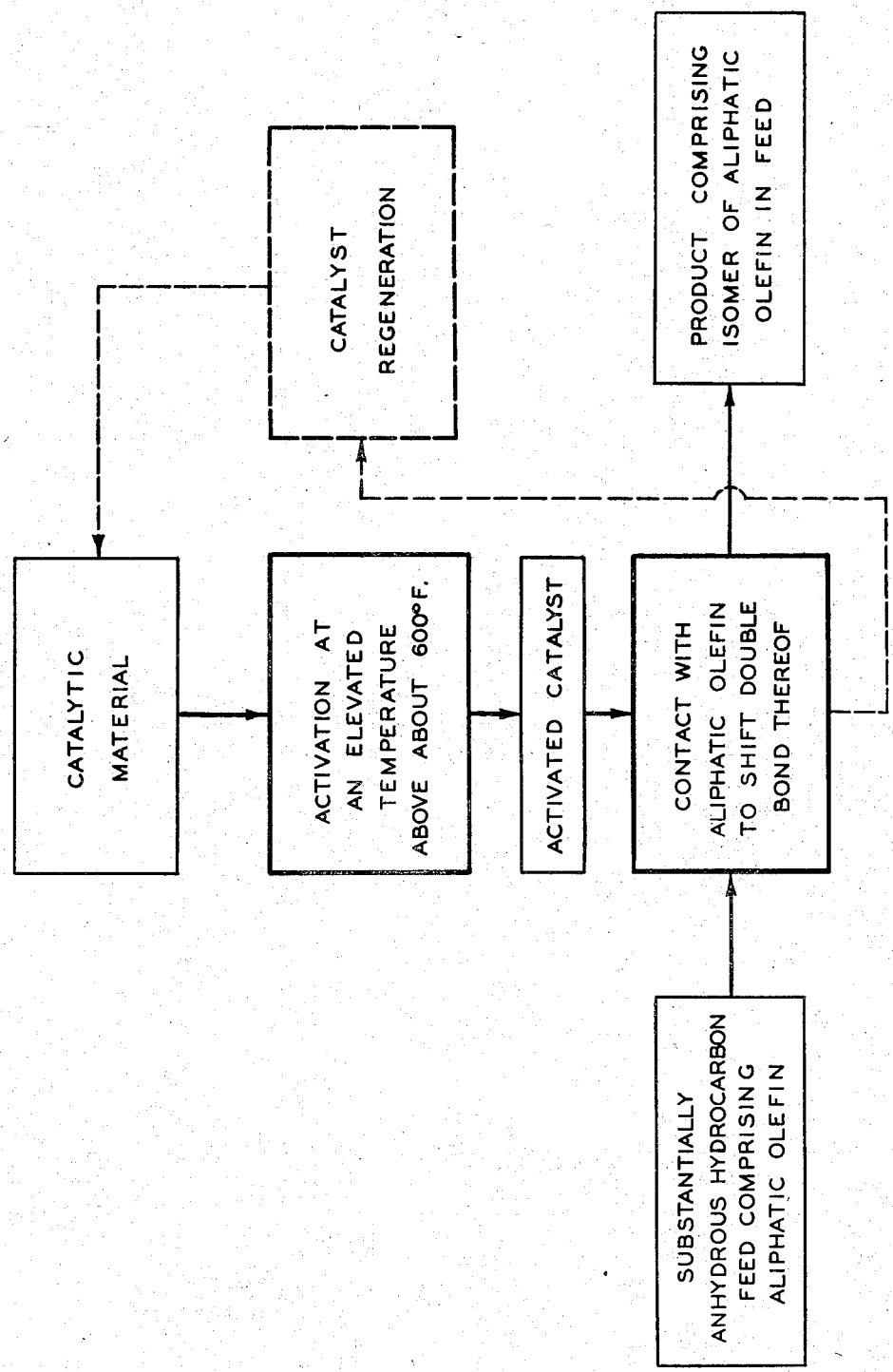

PROCESS AND CATALYST FOR THE ISOMERIZATION OF HYDROCARBONS

Harry E. Drennan, Bartlesville, Okla., assignor to Phillips Petroleum Company, a corporation of Delaware Application July 13, 1942, Serial No. 450,797

11 Claims. (Cl. 260—683.2)

This invention relates to the catalytic isomerization of olefinic hydrocarbons, and more specifically, to an improved process for preparing and utilizing novel catalysts which are effective for the conversion of alpha olefins to beta olefins in hydrocarbon mixtures. The catalysts of this invention are especially useful in the conversion of butene-1 to butene-2, and are particularly effective in this reaction when prepared according to the present invention.

Alpha olefins generally referred to as 1-olefins undergo an isomerization reaction whereby the unsaturated linkage migrates toward the center of the carbon chain. In the case of normal $C_4$ olefins this reaction may be represented by the equation,

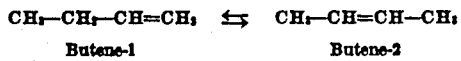

$$CH_3-CH_2-CH=CH_2 \rightleftarrows CH_3-CH=CH-CH_3$$
Butene-1  Butene-2

The isomers thus represented are similar in many of their chemical properties but differ rather widely in some physical characteristics. The 1-olefins, for example, may be lower-boiling than the isomers or the corresponding paraffin hydrocarbons. This quality of butene-1, for example, causes it to complicate the separation steps of processes producing or utilizing $C_4$ olefins, diolefins or iso-olefins since the boiling point of butene-1 is practically the same as that of isobutylene and butadiene 1,3. Thus butene-1 may appear as a contaminant in isobutylene or butadiene fractions prepared by distillation, and processes involving the recovery of butenes from $C_4$ mixtures are subject to difficulties and losses since an appreciable portion of said butenes may be present as an isomer lower-boiling than the normal paraffin.

On the basis of these and other considerations it is often desirable to have the normal $C_4$ and higher olefins as completely as possible in either the alpha or the beta form, and for many processes the latter form is preferable. Inability to bring about this conversion or isomerization has led in some cases to the employment of complex chemical separation and/or solvent extraction methods for the segregation of olefinic constituents in a hydrocarbon mixture.

The reaction which isomerizes alpha olefins by shifting of the unsaturated linkage has been found to be of the time-equilibrium type. Thus butene-1 is converted gradually into butene-2 or vice versa until the equilibrium concentration for a particular temperature is reached. Values for the equilibrium concentrations at various temperatures have been recorded as shown in the following table.

| Temperature, °F. | Mol per cent of total butenes | |
|---|---|---|
|  | Butene-1 | Butene-2 |
| 80 | 3 | 97 |
| 260 | 8 | 92 |
| 440 | 14 | 86 |
| 620 | 20 | 80 |
| 800 | 26 | 74 |
| 980 | 30 | 70 |
| 1,160 | 35 | 65 |
| 1,340 | 39 | 61 |

The above table shows that at high temperatures maximum amounts of butene-1 are formed, while the maximum concentrations of butene-2 are obtained at low temperatures. Also, while only about 40 per cent conversion to butene-1 is possible, over 90 per cent conversion to butene-2 is a possibility, if equilibrium can be reached at low temperatures. Since the extent of conversion of one isomer to the other depends on the isomerization reaction, velocity, and on the time allowed for the reaction, it is ordinarily preferred to promote the reaction velocity in order to decrease the reaction time.

Isomerization by thermal methods is usually unsatisfactory because of the slow rate of reaction. Thus, at low temperature levels appreciable isomerization is not obtained and high temperatures are not only unfavorable to butene-2 formation but also may cause thermal decomposition or other yield-reducing side reactions. Attempts have been made to control the rate of isomerization reactions by means of catalysts and thus to obtain extensive isomerization at relatively low temperatures. The difficulty with many previous catalytic processes is that the less active catalysts require high temperatures with the result that butene-2 concentrations are limited while the more active catalysts concurrently promote polymerization reactions which result in excessive losses of olefins and other reactive components of hydrocarbon mixtures undergoing isomerization. For example, such catalysts as strong mineral acids unless carefully controlled may produce excessive polymerization of the reactive olefins, while catalysts such as calcium oxide, aluminum phosphate, and the like have been used only at temperatures above 750° F. even when contact times were very long. In this connection it has been reported that the extent of isomerization in the presence of catalysts such as difficultly reducible metal oxides and various metal salts in the temperature range of 750 to 1100° F. is substantially the same as that obtained thermally in the absence of a catalyst at 1022° F.

I have now discovered that the rate and extent of olefin isomerization over many of these solid contact catalysts can be radically altered and improved by employing an activation treatment and supplementary process steps which produce a degree of activity heretofore unknown. The magnitude of the improvement obtained by my process may be seen from the fact that catalysts previously reported as active only at temperatures of 750° F. or higher may now be employed at high flow rates and at temperatures in the range of about 100° F. to about 600° F. The resulting increase in maximum butene-2 production is from about 74 to about 95 mol per cent of the total butenes present in a mixture undergoing treatment.

An object of this invention is to provide new and improved catalysts for the isomerization of olefins.

Another object of this invention is to provide catalysts of high selectivity in promoting the conversion of butene-1 to butene-2 with a minimum of undesirable side reactions.

Still another object of this invention is to provide an improved process for the isomerization of olefins.

A further object of this invention is to provide a process for the activation of olefin-isomerization catalysts.

A still further object of this invention is to provide a process for the regeneration of catalysts for the isomerization of olefins.

The figure is a self-explanatory flow sheet illustrating the present invention.

In a specific sense, this invention contemplates the employment of special conditions for the activation, and/or regeneration of certain types of solid adsorbent catalysts in the specified isomerization of aliphatic olefins. Moreover, the observance of the precautions for feed pretreatment which are given in full below are essential in maintaining the activity of the catalytic materials at high levels for extended periods of operation, although operations at a low level of efficiency may be possible under less careful regulation of conditions.

I have found that catalysts of extraordinary activity in the isomerization of olefins may be prepared by activation of solid catalytic materials which promote isomerization of aliphatic olefins by shifting of the double bond. Among the solid catalytic materials which are known to be isomerization catalysts are metal oxides, particularly the difficultly reducible metal oxides, for example, aluminum oxide, chromium oxides, molybdenum oxide, magnesium oxide, and zinc oxide; the alkaline earth oxides; and natural minerals or synthetic materials containing these oxides or compounds convertible to the oxides. The natural minerals which may be employed in this invention include bauxite, magnesite, and brucite. Other catalytic materials which may be treated in accordance with the present invention to produce improved catalysts are the relatively neutral metal salts which act as isomerization catalysts for olefins, for example, the borates, sulfates, silicates, and phosphates of aluminum, magnesium, and zinc. The activation is accomplished by treatment of the catalytic material at temperatures above about 600° F., which are markedly higher than the temperatures at which the isomerization treatment is normally operated.

In the activation of these catalysts at temperatures usually above about 600° F., a number of concurrent transformations may occur. While the extent to which each of these changes brings about activation is not known, it seems likely that the removal of water and carbon dioxide is of great importance and further benefits may result from removal of non-hydrocarbon gases which are reactive toward the catalysts. The water removed may represent adsorbed water and a substantial proportion of any water of constitution. Metal hydroxides or hydrated oxides are converted by this step to the corresponding oxides. In general, it is preferred to continue the dehydration of a catalyst to remove substantially all water that can be abstracted without altering the physical characteristics and adsorptive capacity of the material. To avoid such alterations, temperatures above about 1400° F., are not ordinarily employed. The temperature and the length of time required for the activation will vary with the catalyst as will be shown hereinafter.

The adsorbent contact catalysts exhibit widely different dehydration characteristics which will require adjustment of the time and temperature of the heat treatment to give satisfactory activation. In most cases dehydration may be accomplished at temperatures above about 700 to 800° F., although the time required is much less when higher temperatures up to about 1300 or 1400° F. are employed. It is usually advantageous to pass a stream of inert gas through the bed of catalyst undergoing activation in order to aid in the sweeping out of desorbed gases. The flushing gas may be any gas which does not react with or become adsorbed on the catalyst at the activation temperature. Gases suitable for this purpose include air, steam, nitrogen, light hydrocarbon vapors, etc. In some cases hydrogen may be used, for example, when possible hydrogenation does not interfere with the activation. The use of steam is permissible as long as the steam is swept out prior to cooling to temperatures which allow adsorption of water by the catalyst. Hydrocarbon vapors are not employed at temperatures causing decomposition or cracking, since the carbon deposited on the catalyst may impair its activity.

At the end of the heating period and before the temperature is dropped to the levels to be employed in isomerization, precautions are taken to remove from the catalyst space any gases or vapors, such as steam or carbon dioxide, which might be retained by the catalyst. This latter step is of particular value in the case of alkaline-reacting oxides which react with acidic gases such as carbon oxides to the detriment of the catalyst.

It has been noted that the activation of natural carbonate minerals such as magnesite ($MgCO_3$) or of metal oxide catalysts such as brucite containing minor amounts of the carbonate is much more effective when adsorbed or combined carbon dioxide is removed. This phase of the activation treatment may often be performed along with dehydration by the use of high temperatures and a relatively carbon dioxide-free flushing gas. In other cases a preliminary treatment at activation temperatures with steam or gases containing steam may serve to expedite decomposition of carbonates and removal of carbon dioxide. In such cases the catalyst is subsequently dehydrated at or about the steam treating temperatures to complete the activation. Where a catalyst is found to be susceptible to carbonate formation, the precautions during the cooling period following activation will, of course, include the elimination of carbon dioxide.

The catalysts activated according to the method described above have exceptional activity for olefin isomerization at low temperatures as long as the effects of activation are not destroyed during operation. This means in turn, that the hydrocarbons undergoing treatment should be substantially free of water and carbon dioxide while operating temperatures are such that these compounds will be adsorbed by the catalyst. The threshold temperature for water adsorption by the catalysts will vary somewhat with the partial pressure of water vapor in the feed stock and the total system pressure, but it has been found advantageous to substantially completely dehydrate the hydrocarbon feed when operating at temperatures below about 500 to 600° F. in order to prolong operating periods. The effect of water vapor in the feed stock is even greater than could be predicted from its relative concentration, and a very small amount is sufficient to alter the catalyst activity to the point demanding reactivation.

Pretreatment of the hydrocarbon feed for water removal may be accomplished by conventional means including passage over adsorbent desiccants such as activated alumina, calcined bauxite or brucite, silica gel, and the like so long as no deleterious substances are transferred by the desiccant to the hydrocarbon and the necessary degree of dehydration is obtained. Preliminary drying may often be obtained during preparation of the hydrocarbon feed, for example, in fractionating operations. Thus, a depropanizing step may serve to partially dehydrate a $C_4$ hydrocarbon feed.

It will be noted that the solid desiccant in some instances may be the same as the catalyst and be operated at a lower, usually atmospheric, temperature. This arrangement serves the purpose of protecting the catalyst from water vapor and other deleterious compounds such as carbon dioxide by providing more complete pretreatment and purification in the desiccant bed. These solid adsorbent desiccants are also preferred because of the completeness of water removal and the fact that regeneration may be easily effected by heating to moderately elevated temperatures, although not ordinarily as high as those employed for catalyst reactivation.

In the production of 2-olefins from 1-olefins, the activity of the catalyst and the efficiency of the process are judged by the temperature range in which equilibrium isomerization is obtained at practical flow rates. In my co-pending application, Serial No. 446,771, filed June 12, 1942, a highly efficient isomerization process utilizing magnesium oxide catalysts is described in detail. While the present invention is primarily concerned with the activation of the catalysts and the pretreatment of the feed stock, an outline of the isomerization process steps may aid in the exemplification of advantages of the novel activation and feed dehydration.

A specific embodiment of the invention involves dehydration of a hydrocarbon charge stock containing 1-olefins and preferably free of acidic impurities followed by passage of the charge stock over a granular isomerization catalyst prepared in accordance with the present invention for conversion of 1-olefins to 2-olefins. The dehydration may be accomplished by contacting the charge stock with solid adsorbent desiccant maintained at or near atmospheric temperature to aid in water removal. The catalyst is maintained at an isomerization temperature selected with regard to flow rate, contact time, catalyst activity, and other factors governing the extent of the conversion. The treated hydrocarbon may be utilized elsewhere as desired since the isomerization process does not introduce any impurities or contaminating substances.

The hydrocarbons treated may be relatively pure normal olefins, such as butene-1, pentene-1 or hexene-1, or may be mixtures in which the olefins are mixed with paraffins, isoolefins and the like, which are relatively inert toward the isomerization reaction. Thus, the hydrocarbon feed may be derived from dehydrogenation, cracking or other operations involving normally gaseous or liquid hydrocarbons, after fractionation, purification and/or processing to segregate a feed stock of suitable composition and boiling range. Thus, it may be desirable to partially segregate $C_4$ hydrocarbon mixtures from lighter hydrocarbons prior to treatment in order to reduce the volume handled and operate most economically.

The hydrocarbons may be treated in liquid phase or in vapor phase, providing sufficient contact time is provided. In general, liquid phase operation is preferable at temperatures below the critical temperature of the feed, since the feed pretreatment is more efficient, and longer contact time is possible with smaller catalyst beds and with practical treating rates. Treating flow rates may range from about 0.1 to about 10 liquid volumes per hour per volume of catalyst, or from about 100 to about 2000 gas volumes per hour per volume of catalyst. Pressures are, of course, regulated according to the process requirements and may range from about atmospheric to those necessary to maintain liquid phase conditions.

A distinct advantage of the present invention is that the catalysts produce substantially equilibrium concentrations of the normal olefin isomers at temperatures in the range of about atmospheric to about 600° F. Since the lower temperatures favor 2-olefin formation, it is preferred to use the lowest temperature which will give satisfactory conversion at practical flow rates. Temperatures of about atmospheric to about 300° F. are often employed when the 1-olefin concentration is to be reduced to a practical minimum, whereas, higher temperatures above about 300° F. may be employed when less complete isomerization is feasible.

A further advantage of operation at low temperatures is the substantial absence of coke or carbonaceous deposits on the catalyst. Under these conditions, the length of the operating period is usually a function of the efficiency of the feed pretreating step. Thus, long on-stream periods are possible before the catalyst activity at the preferred low temperatures is impaired. In some cases traces of polymer may be formed during the catalytic treatment, but the amount is ordinarily negligible and removal from the catalyst is not difficult, particularly when operating in liquid phase.

When, after long operating periods, the catalyst becomes poisoned and conversion declines, reactivation may be accomplished by means similar to the activation procedure, or by variations thereof, according to the particular catalyst. When loss of activity is principally due to gradual accumulation of water vapor on the catalyst, reactivation may be accomplished by heating to a temperature such that the water is rapidly desorbed. This temperature will vary with the different adsorbent materials, but it has been noted that in many cases after one dehydration or calcining at high temperatures, subsequent dehydrations of bauxite, brucite, etc., may be accomplished at somewhat lower temperatures. In any case, the catalyst is heated to drive out water, preferably using a flushing gas to expedite dehydration. Other contaminating substances are removed in the same operation, provided the temperature is regulated according to the procedure for the original catalyst activation. A rapid means of catalyst reactivation in situ when treating $C_4$ mixtures comprises removing water vapor by passing over the catalyst the vapors of the feed mixture at low pressure while heating the catalyst to 500° F. to about 800° F. Following reactivation, the catalyst is again cooled to operating temperature to resume the treatment.

The olefins treated by this process may be derived from any source and the process itself may be a part of manufacturing operations in which the olefins are either an intermediate or an end product. In such applications utilization of the products of the isomerization treatment may be integrated with the operations which produce the feed to the isomerization treatment with resulting economic benefits.

A number of exemplary operations employing this invention are described below to provide a more detailed description of the process.

Example 1

Brucite catalyst was heated to 550° F. and flushed with nitrogen for several hours prior to use in the isomerization of butene-1. Butene-1 was passed at 550° F. over this catalyst in vapor phase at a flow rate of 500 gas volumes per hour per volume of catalyst without appreciable conversion to butene-2. The same catalyst was then heated for several hours at 1000° F. to effect substantial dehydration. The catalyst was cooled in an atmosphere of dry nitrogen from 1000° F. to 300° F. and butene-1 vapor was again passed through at a flow rate of 1000 gas volumes per hour per volume of catalyst. The effluent vapor contained 92 volume per cent butene-2.

When the catalyst activity declined, reactivation was accomplished by again heating to 1100–1200° F. in a stream of natural gas. The reactivated catalyst was then used to treat a blend of 70 volume per cent n-butane and 30 volume per cent butene-1 in liquid phase at 225° F. and 300 pounds per square inch gage pressure. The liquid feed was pretreated through brucite dried at 700° F. and the operating period was continued 100 hours. The effluent liquid contained 70 volume per cent n-butane, 28 per cent butene-2 and 2 per cent butene-1.

Example 2

A magnesia catalyst containing some carbonate as a result of burning off carbon deposits was activated for isomerization by treating with steam at 700° F. to remove carbon dioxide and then dehydrating with dry nitrogen at 700–800° F. Butene-1 vapor was passed over the activated catalyst at 290° F. and a space velocity of 540 to produce an effluent containing over 90 volume per cent butene-2.

Example 3

Bauxite catalyst was used in the isomerization of butene-1 to butene-2 at temperatures of 350, 550 and 750° F. The conversion ranged from 40 to 60 per cent at the two higher temperatures but was negligible below 550° F. Polymer formation was promoted at temperatures above 500° F.

The bauxite was then heated at 1200° F. in a stream of air until no further volatile matter was removed. The calcined catalyst was cooled to 350° F. in a stream of dry nitrogen and again used to isomerize butene-1 vapor at this temperature and a space velocity of 540. The effluent vapor contained over 90 per cent butene-2 and polymer formation was negligible. With a dehydrator on the feed vapor, the operating period was prolonged. Reactivation of the catalyst was accomplished by reheating the catalyst to 1100° F. in air and again cooling to 350° F. in a stream of dry gas.

Example 4

A catalyst prepared by supporting aluminum sulfate on pumice was found to convert about 40 per cent of butene-1 to butene-2 at a temperature of 700° F. and was substantially inactive below 600° F. When activated at 900° F. to effect dehydration, the same catalyst produced over 75 per cent conversion at 500° F.

Example 5

The conversion of butene-1 to butene-2 over a synthetic alumina catalyst at a temperature of 450° F. and a space velocity of 540 was increased from 5 per cent to 85 per cent by activating the catalyst at 1250° F. prior to use.

Example 6

Catalysts consisting of an alumina or porcelain base bearing minor proportions of (1) aluminum phosphate, (2) nickel sulfate, (3) chromium oxide, and (4) molybdenum oxide were activated by dehydration at temperatures of 700–1000° F. After the activation isomerization of thoroughly dehydrated butene-1 to butene-2 was accomplished at temperatures in the range of 400 to 550° F.

Example 7

Pentene-1 diluted with n-pentane was isomerized over magnesia activated by heating at 1000° F. to substantially anhydrous condition. The conversion to pentene-2 at 300° F. was higher than obtained with the same charge at 700° F. over unactivated magnesia catalyst.

Example 8

In preparation for treating butene-1 to produce butene-2, brucite was heated at about 1200° F. for a period of five hours while passing a stream of air over the catalyst to sweep out the desorbed gases. After the heating period the catalyst was swept out with dry nitrogen while dropping the temperature to reaction conditions. When the catalyst had cooled to 260° F. the dehydrated feed stock, containing 91 per cent butene-1 and 9 per cent butene-2, was passed in at a pressure of 300 pounds per square inch and a flow rate of 2 liquid volumes per hour per volume of catalyst. The effluent from the catalyst contained 96 per cent butene-2 and 4 per cent butene-1 during a period of five days of continuous operation. At the conclusion of the fifth day of treating, a minute amount of steam was injected into the charge stock just prior to its entrance to the catalyst. Within 30 minutes the product contained only about 25 per cent butene-2 and 75 per cent unconverted butene-1 and conversion declined rapidly to zero. In order to check this more completely, a batch of catalyst prepared as above was contacted with the same liquid feed stock saturated with water. The catalyst activity declined rapidly after three hours operation.

Example 9

As part of a manufacturing process it was desired to convert as completely as possible the butene-1 content of a $C_4$ cut to butene-2. The fraction contained 30 per cent isobutane, 42 per cent n-butane, 24 per cent butene-1, and 4 per cent butene-2. A bauxite catalyst was used. Operating at 350° F. and a flow rate of one liquid volume of feed per hour per volume of catalyst without any pretreatment, no isomerization was observed. The catalyst bed was then swept out with dry methane while the temperature was raised to 1100° F. The heating was continued for 6 hours at the temperature named after which the temperature was reduced again to 350° F. When the feed stock was again passed over the catalyst, the effluent contained about 25 per cent butene-2, 3 per cent butene-1 and the saturated hydrocarbons were not affected.

Example 10

Brucite catalyst was activated by treatment with steam at 800° F. until the effluent gas stream was free of $CO_2$, then treated with dry methane at 1100° F. until substantially completely dehydrated. The catalyst was placed in two chambers arranged for series flow, and a $C_4$ mixture containing 70 per cent n-butane, 20 per cent butene-2 and 10 per cent butene-1 was passed in liquid phase through the catalyst chambers at atmospheric temperature and a flow rate of 0.6 liquid volume per volume of catalyst per hour. The effluent of the first chamber which was to serve as dehydrator contained less than about two per cent butene-1 for a 12 hour period indicating nearly equilibrium isomerization. After the catalyst in the first chamber had decreased in activity due to water adsorption, the catalyst in the second chamber continued to produce equivalent isomerization for a 36 hour period. When the butene-1 content of the product from the second chamber exceeded about three per cent, the catalyst in both chambers was reactivated.

The exemplary operations might be multiplied indefinitely to show specific applications of the present invention. However, since various modifications and details of specific operations are obviously within the broad scope of this disclosure, no limitations are intended except as defined in the following claims.

What is claimed is:

1. A process for the isomerization of aliphatic olefins by shifting of the double bond which comprises treating a hydrocarbon mixture containing said olefins to effect substantially complete dehydration and passing the dehydrated hydrocarbons in contact with a solid adsorbent isomerization catalyst, said catalyst having been activated prior to the introduction of said hydrocarbons by heating to a temperature substantially above isomerization temperature for a period of time sufficient to desorb and remove therefrom water vapor and adsorbed reactive non-hydrocarbon gases.

2. A process for the isomerization of aliphatic olefins by shifting of the double bond which comprises treating a hydrocarbon mixture containing said olefins to effect substantially complete dehydration, passing the dehydrated hydrocarbons at temperatures in the range of about atmospheric to about 600 F. in contact with a solid adsorbent isomerization catalyst, said catalyst, having been activated prior to introduction of said hydrocarbons by heating to a temperature higher than about 600° F. for a period of time sufficient to desorb and remove therefrom water and adsorbed reactive non-hydrocarbon gases.

3. A process for the isomerization of aliphatic olefins by shifting of the double bond which comprises treating a hydrocarbon mixture containing said olefins to effect substantially complete dehydration thereof and passing the dehydrated hydrocarbons at isomerization temperatures into contact with a solid adsorbent catalyst comprising a difficultly reducible metal oxide isomerization catalyst, said catalyst having been activated prior to contact with the hydrocarbons by heating to a temperature above about 600° F. for a period of time sufficient to desorb and remove therefrom water and adsorbed reactive non-hydrocarbon gases.

4. A process for the isomerization of aliphatic olefins by shifting of the double bond which comprises treating a hydrocarbon mixture containing said olefins to effect substantially complete dehydration thereof and passing the dehydrated hydrocarbons at isomerization temperatures into contact with a solid adsorbent catalyst comprising a metal salt isomerization catalyst, said catalyst having been activated prior to contact with the hydrocarbons by heating to a temperature above about 600° F. for a period of time sufficient to desorb and remove therefrom water and adsorbed reactive non-hydrocarbon gases.

5. A process for the isomerization of aliphatic olefins by shifting of the double bond which comprises treating a hydrocarbon mixture containing said olefins to effect substantially complete dehydration thereof and passing the dehydrated hydrocarbons at isomerization temperatures into contact with bauxite, said bauxite having been activated prior to contact with the hydrocarbons by heating to a temperature above about 600° F. for a period of time sufficient to desorb and remove therefrom water and adsorbed reactive non-hydrocarbon gases.

6. A process according to claim 3 in which the metal oxide is present in the form of naturally occurring mineral containing catalytic amounts thereof.

7. A process for the isomerization of alpha olefins by shifting of the double bond which comprises dehydrating the alpha olefins to effect substantially complete removal of water therefrom, and passing the dehydrated alpha olefins at temperatures within the range of 50° F. to about 600° F. into contact with a solid adsorbent isomerization catalyst, said catalyst having been activated prior to contact with the hydrocarbons by heating to a temperature above about 600° F. for a period of time sufficient to desorb and remove therefrom water and adsorbed reactive non-hydrocarbon gases.

8. A process according to claim 7 in which the alpha olefin is butene-1.

9. A process according to claim 7 in which the alpha olefin is pentene-1.

10. A process for the isomerization of alpha olefins by shifting of the double bond which comprises dehydrating the alpha olefins in a dehydration step with a solid adsorbent desiccant derived from a subsequent isomerization step, passing the effluent of the dehydration step into contact with a solid adsorbent isomerization catalyst in an isomerization step, said catalyst having been activated prior to contact with the hydrocarbons by heating to a temperature above about 600° F. for a period of time sufficient to desorb and remove therefrom water and adsorbed reactive non-hydrocarbon gases, and utilizing catalyst from the isomerization step as the desiccant in the dehydration step.

11. A process for the isomerization of olefin hydrocarbons by shifting the double bond which comprises the steps of substantially completely dehydrating said hydrocarbons, treating the said dehydrated hydrocarbons over a solid adsorbent isomerization catalyst activated by heating to a temperature substantially above isomerization temperature for a period of time sufficient to desorb and remove water vapor and adsorbed reactive non-hydrocarbon gases, interrupting the treatment when the catalyst activity declines, and restoring the catalyst to substantially its original activity by heating to a temperature substantially above isomerization temperature to desorb and remove water vapor and adsorbed reactive non-hydrocarbon gases accumulated during the catalytic treatment.

HARRY E. DRENNAN.

CERTIFICATE OF CORRECTION.

Patent No. 2,353,552.  July 11, 1944.

HARRY E. DRENNAN.

It is hereby certified that error appears in the printed specification of the above numbered patent requiring correction as follows: Page 3, first column, line 1, for the word "about" read --above--; and that the said Letters Patent should be read with this correction therein that the same may conform to the record of the case in the Patent Office.

Signed and sealed this 28th day of November, A. D. 1944.

Leslie Frazer (Seal) Acting Commissioner of Patents.